(12) United States Patent
Rowe

(10) Patent No.: US 9,639,817 B2
(45) Date of Patent: May 2, 2017

(54) REMOTE METERING FOR PANELIST WEB USAGE

(71) Applicant: Google Inc., Mountain View, CA (US)

(72) Inventor: Simon Michael Rowe, Berkshire (GB)

(73) Assignee: Google, Inc., Mountain View, CA (US)

( * ) Notice: Subject to any disclaimer, the term of this patent is extended or adjusted under 35 U.S.C. 154(b) by 497 days.

(21) Appl. No.: 14/079,262

(22) Filed: Nov. 13, 2013

(65) Prior Publication Data

US 2015/0365310 A1   Dec. 17, 2015

(51) Int. Cl.
*G06F 15/173*   (2006.01)
*G06Q 10/06*   (2012.01)
*H04L 29/08*   (2006.01)

(52) U.S. Cl.
CPC .......... *G06Q 10/06* (2013.01); *H04L 67/02* (2013.01); *H04L 67/22* (2013.01)

(58) Field of Classification Search
CPC ............ H04L 43/0876; H04L 12/2634; H04L 41/046; H04L 67/02; H04L 67/04
USPC ................................................. 709/224, 226
See application file for complete search history.

(56) References Cited

U.S. PATENT DOCUMENTS

| | | | | |
|---|---|---|---|---|
| 8,834,175 B1* | 9/2014 | Daddi | ...................... | G09B 5/00 434/322 |
| 2008/0009344 A1* | 1/2008 | Graham | .................. | G07F 17/32 463/25 |
| 2009/0099862 A1* | 4/2009 | Fireman | .............. | G06F 19/3418 705/2 |
| 2009/0298480 A1* | 12/2009 | Khambete | ......... | G06F 17/30699 455/414.1 |
| 2010/0105454 A1* | 4/2010 | Weber | .................... | G06Q 30/02 463/1 |
| 2011/0055378 A1 | 3/2011 | Ferris et al. | | |
| 2011/0131499 A1 | 6/2011 | Ferris et al. | | |
| 2011/0138034 A1 | 6/2011 | Brookbanks et al. | | |
| 2012/0260192 A1 | 10/2012 | Detweiler | | |
| 2013/0019015 A1* | 1/2013 | Devarakonda | ........ | G06F 9/5072 709/226 |
| 2013/0080642 A1* | 3/2013 | Adam | ................... | G06F 15/173 709/226 |
| 2013/0091285 A1* | 4/2013 | Devarakonda | ........ | G06F 9/4856 709/226 |
| 2013/0185413 A1* | 7/2013 | Beaty | .................... | G06F 9/5072 709/224 |
| 2014/0075013 A1* | 3/2014 | Agrawal | ............. | G06F 11/3495 709/224 |

FOREIGN PATENT DOCUMENTS

EP        2493149 A1        8/2012

\* cited by examiner

*Primary Examiner* — Randy Scott
*Assistant Examiner* — Vitali Korobov
(74) *Attorney, Agent, or Firm* — Foley & Lardner LLP; John D. Lanza

(57) ABSTRACT

A method for remotely recording Web usage by a panelist includes receiving at a remote processor, a command from a local client to display a Web page; identifying the local client and the panelist operating the local client; accessing the Web page; rendering the Web page in a remote browser; sending an image of the Web page to a local browser of the local client; and recording Web usage metrics associated with a display of the image on the local browser.

20 Claims, 4 Drawing Sheets

REMOTE METERING FOR PANELIST WEB USAGE

BACKGROUND

A panel is a collection of recruited individuals who agree to the collection of data related to some aspect of their behavior, usually in return for compensation. Panels may be used for a single media outlet, such as over-the-air broadcast television program viewing, product purchases, and Internet Web browsing. A single source panel (SSP) may combine many different behavioral aspects.

To collect behavioral data, some panel organizations provide specialized software or hardware devices for installation at an individual's residence; presumably, most behavior to be monitored (e.g., Web usage, television program viewing) occurs at the individual's residence.

SUMMARY

A method for remotely recording Web usage by a panelist includes receiving at a remote processor, a command from a local client to display a Web page; identifying the local client and the panelist operating the local client; accessing the Web page; rendering the Web page in a remote browser; sending an image of the Web page to a local browser of the local client; and recording Web usage metrics associated with a display of the image on the local browser A system for remote metering of Internet Web usage by a panelist includes a computer readable storage medium including remote metering instructions and remote navigation instructions; a thin browser installed on a local media device, the local media device comprising a local processor; a fat browser installed on a remote server, the remote server comprising a remote processor; wherein the local processor executes the instructions to send navigation signals to the fat browser, and receive and display in the thin browser images of Web resources accessed by the fat browser; and the remote processor receives the navigation signals from the local processor, directs the fat browser to access resources as indicated by the navigation signals, renders the accessed resources in the fat browser, sends images of the rendered resources to the thin browser, and record the resource accesses as Web usage by the panelist.

A method, implemented on a processor, for remote metering of resource usage by a panelist includes initiating a first resource access using a local media device; sending a resource access signal to a remote media device; receiving, from the remote media device, an image of the first resource; sending second and subsequent resource access requests to the remote media device; receiving, from the remote media device, images of the second and subsequent resources; and recording access data for the first, second, and subsequent resource access requests at the remote media device.

A computer readable storage medium includes instructions for remote metering of resource usage by a panelist that when implemented by a processor, cause the processor to initiate a first resource access using a local media device; send a resource access signal to a remote media device; receive, from the remote media device, an image of the first resource; send second and subsequent resource access requests to the remote media device; receive, from the remote media device, images of the second and subsequent resources; and record access data for the first, second, and subsequent resource access requests at the remote media device,

DESCRIPTION OF THE DRAWINGS

The detailed description refers to the following figures in which like numerals refer to like items, and in which.

DETAILED DESCRIPTION

In one aspect, a panel is an assembly of recruited individuals who agree to the collection of data related to some aspect of their behavior, usually in return for compensation. Panels may be used for a single media outlet, such as over-the-air broadcast television program viewing, product purchases, and Internet Web browsing. A single source panel (SSP) may combine many different behavioral aspects.

Internet-based media providers may use panels to capture Web usage from a wide variety of media devices in use by panelists. The panels may be built in many forms in many countries.

In order to collect panelist Web usage data, some current panel organizations supply panelists with specialized fat client software for installation on a client device (e.g., a laptop computer) or with hardware devices. The software or hardware typically is installed at a panelist's residence under the assumption that most panelist activity of interest (e.g., Web usage, television program viewing) occurs in the panelist's residence. Either a client software or a hardware approach requires a significant installation on a client.

Furthermore, installation of software or hardware at a panelist's residence may not account for Web usage occurring away from the residence. For example, the panelist may navigate Internet Web sites when traveling. Thus, an in-residence monitoring approach may not accurately or completely account for all Web usage.

To address the above described limitations, as well as other limitations, of current metering approaches, disclosed herein are systems and associated methods that include panelist metering with a remote browser following a software as a service (SASS) model. With these systems, a server-side, full-featured (fat) browser operates remotely from a client, and the client incorporates a local (thin) browser that communicates with the server-side, remote browser to enable Web site navigation and content download and viewing. In this architecture, the server side, remote browser may been implement a logging client on the server. A panel organization may provide individual panelists or households with the local browser. This architecture is simple and platform agnostic, thereby obviating the need for a complex, platform dependent client code.

Figure 1:
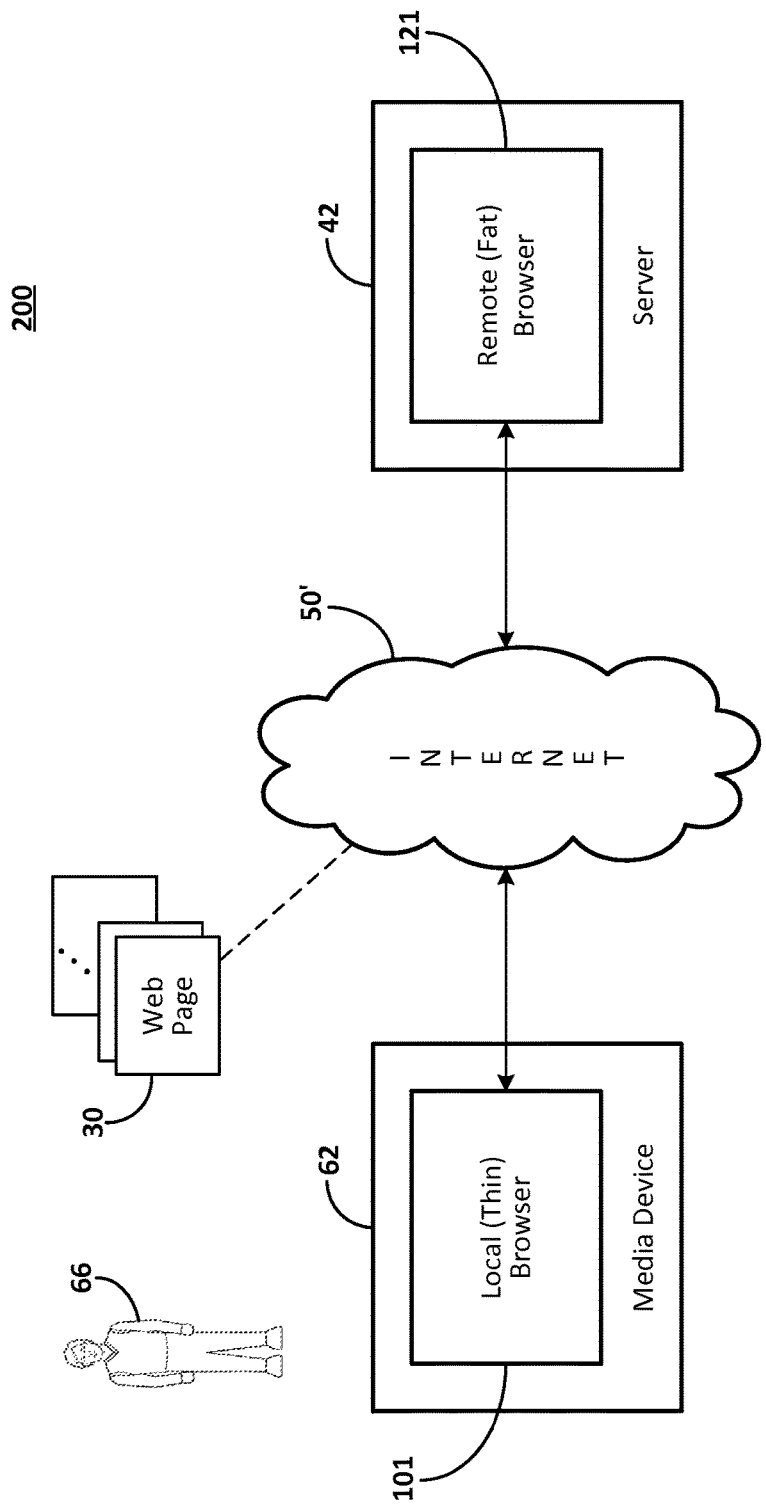
FIG. 1 illustrates an example architecture that provides remote metering of panelist Web usage.

FIG. 1 is a simplified block diagram of a client-server architecture that enables remote monitoring of panelist Web site usage. In FIG. 1, architecture 200 includes local browser 101 in communication with remote browser 121 over Internet 50'. The remote browser is installed on remote analytics server 42, which is a hardware component of an analytics service that operates a panel. The local browser 101 is installed on media device 62, which is operated by panelist 66 to view Web pages 30.

To view Web page 30, the panelist 66 may click on a link shown on a Web page displayed in a video player enabled by the remote browser 121. That is, the panelist 66 may navigate from a first Web page 30 to a second Web page 30 by clicking on a link on the first Web page 30. The first Web page 30 may be rendered by the remote browser 121 and the panelist 66 may view the first Web page 30 by using the local browser 101. When the panelist 66 initiates an action or issues a command, the local browser 101 sends a signal to the remote browser 121, which executes the action or responds to the command.

Figure 2:
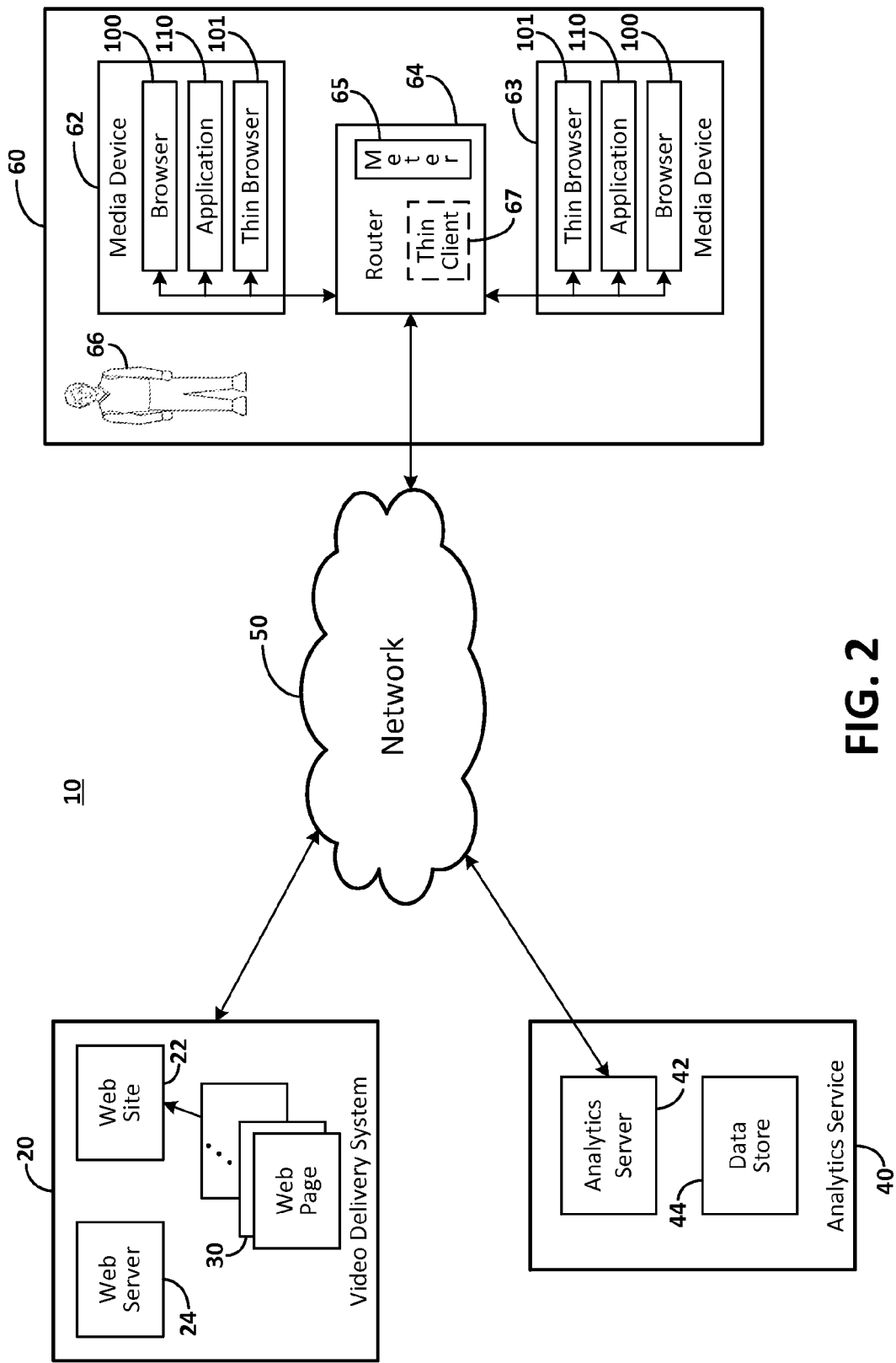
FIG. 2 illustrates an example environment that supports remote metering for panelist Web usage.

FIG. 2 illustrates an example environment that supports remote metering for panelist Web usage. In FIG. 1, environment 10 includes program provider 20, analytics service 40 and viewing location 60, all of which are connected by network 50. Although FIG. 1 shows these entities as separate and apart, at least some of the entities may be combined or related. For example, the video delivery system 20 and analytics service 40 may be part of a single entity. Other combinations of entities are possible.

The video delivery system 20 operates Web site 22. The Web site 22 is hosted on Web server 24. The Web site 22 includes Web pages 30, The Web site 22 may include Internet search features that allow panelists 66 to search for videos and other content displayed by the Web server 24 on the Web pages 30. The Web pages 30 may display search results, namely content segments such as video programs, as well as video advertisements, static advertisements, and other information. Some advertisements may provide links to other Web pages where video advertisements and promoted video programs are displayed. The Web server 24 may provide links to enable navigation among the Web pages 30.

The Web pages 30 may display search results in response to a search query submitted by panelist 66. For example, a Web page 30 may display several videos that satisfy a search query. Each such video may be assigned a unique identification (ID).

The analytics service 40 controls one or more panels. The analytics service 40 may collect data related to operation of the panels. That is, the analytics service 40 may collect Web usage data from media devices operated by the panelist 66. The analytics service 40 may store the data in data store 44.

The analytics service 40 operates server 42 on which is installed remote browser 121 and components of data logging and analysis system 300 (not shown in FIG. 2).

The analytics service 40 may operate in conjunction with Web site operators to collect, analyze, and report information and data related to visits to Web sites and viewing of video advertisements by panelists 66. The analytics service 40 may be part of the video delivery system 20 or may be a separate entity. The analytics service 40 collects, analyzes, stores (in data store 44), and reports on data and information related to visits to the Web site 22, operation of applications, and other reported activity.

The analytics server 42 includes remote browser 121, which communicates with local browsers 101 at the media devices 62 and 63. The remote browser 121 and local browser 101 thus operate as components of a remote metering architecture 200 to record Web usage by panelist 66 operating media devices 62 and 63. The remote metering architecture 200 allows recording of Web usage whether the media devices 62 and 63 are at the viewing location 60, or are located away from the viewing location 60. Furthermore, since the analytics service 40 need only provide thin client components to panelists, the cost of panel implementation may be reduced.

In an embodiment, given the potentially large number of videos, search engines, and Web pages, the analytics service 40, and particularly the analytics server 42 and its associated data store 44, may be replicated such that the analytics service 40 includes hundreds or thousands of such server-data store combinations in a distributed architecture that makes the analytics service 40 responsive to a very large number of video search requests per unit time.

The network 50 may be any communications network that allows the transmission of signals, media, messages, voice, and data among the entities shown in FIG. 2, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless. The network 50 may be ail or a portion of an enterprise or secured network. In an example, the network 50 may be a virtual private network (VPN) between the video delivery system 20 and a media device at the viewing location 60 across a wire line or a wireless link. While illustrated as a single or continuous network, the network 50 may be divided logically into various sub-nets or virtual networks, so long as at least a portion of the network 50 may facilitate communications among the entities of FIG. 2.

The viewing location 60 may be the residence of an individual, such as panelist 66, who operates media devices 62 and 63 to access, through router 64, resources such as the Web sites 22. The viewing location 60 may be a mobile location that changes with time as, for example, when the panelist 66 changes his location. The media devices 62 and 63 may be fixed or mobile. For example, media device 62 may be an Internet connected "smart" television (ITV); a "basic" or "smart" television connected to a set top box (STB) or other Internet-enabled device; a Blu-ray™ player; a game box; and a radio, for example. Media device 63 may be a tablet, a smartphone, a lap top computer, or a desk top computer, for example. The media devices 62 and 63 may include standard browsers, such as browser 100. The browser 100 may be a software application for retrieving, presenting, and traversing resources such as at the Web site 22. A resource may be identified by a Uniform Resource Locator (URL) and may be a Web page, image, video, or other content. The URL may allow the browser 100 to connect to the Web site 22. Hyperlinks present in resources enable the panelist 66 to navigate the browser 100 to related resources. The panelist 66 may operate the browser 100 to search for Web sites related to specific topics or to search for a specific Web site by URL. The media devices 62 and 63 also may include applications 110. The panelist 66 may cause the media devices 62 or 63 to execute an application 110, such as a mobile banking application, to access online banking services. The application 110 may involve use of a browser or other means, including cellular means, to connect to the online banking services. Other applications may include game applications. The game applications may include provisions for serving video advertisements during the play of the game. Once connected to the Web site 22, the media devices 62 and 63 may allow viewing of content such as videos and static images generated by entities such as the video delivery system 20 and displayed on the Web pages 30 at the Web site 22.

The router 64 may incorporate a meter 65 that may be used to record Web usage by the panelist 66. The meter 65 may be implemented as thin client software. Alternately, each browser 100 (i.e., in media devices 62 and 63) may incorporate thin client software 67, for example, as a plug-in to the browser 100, In either implementation, the thin client software may communicate with a remote data collection system at the analytics service 40.

In another embodiment, each media device may be provided with a local (thin) browser 101. The local browser 101 communicates, through router 64, with remote browser 121. In effect, the local browser 101 operates as a control and display for the remote browser 121, and the remote browser 121 actually navigates the Web sites 22, acquires content (e.g., Web pages 30), and renders the acquired Web pages 30. Thus, the local browser 101 displays a view of the Web pages 30 as they are rendered in the remote browser 121.

Figure 3:
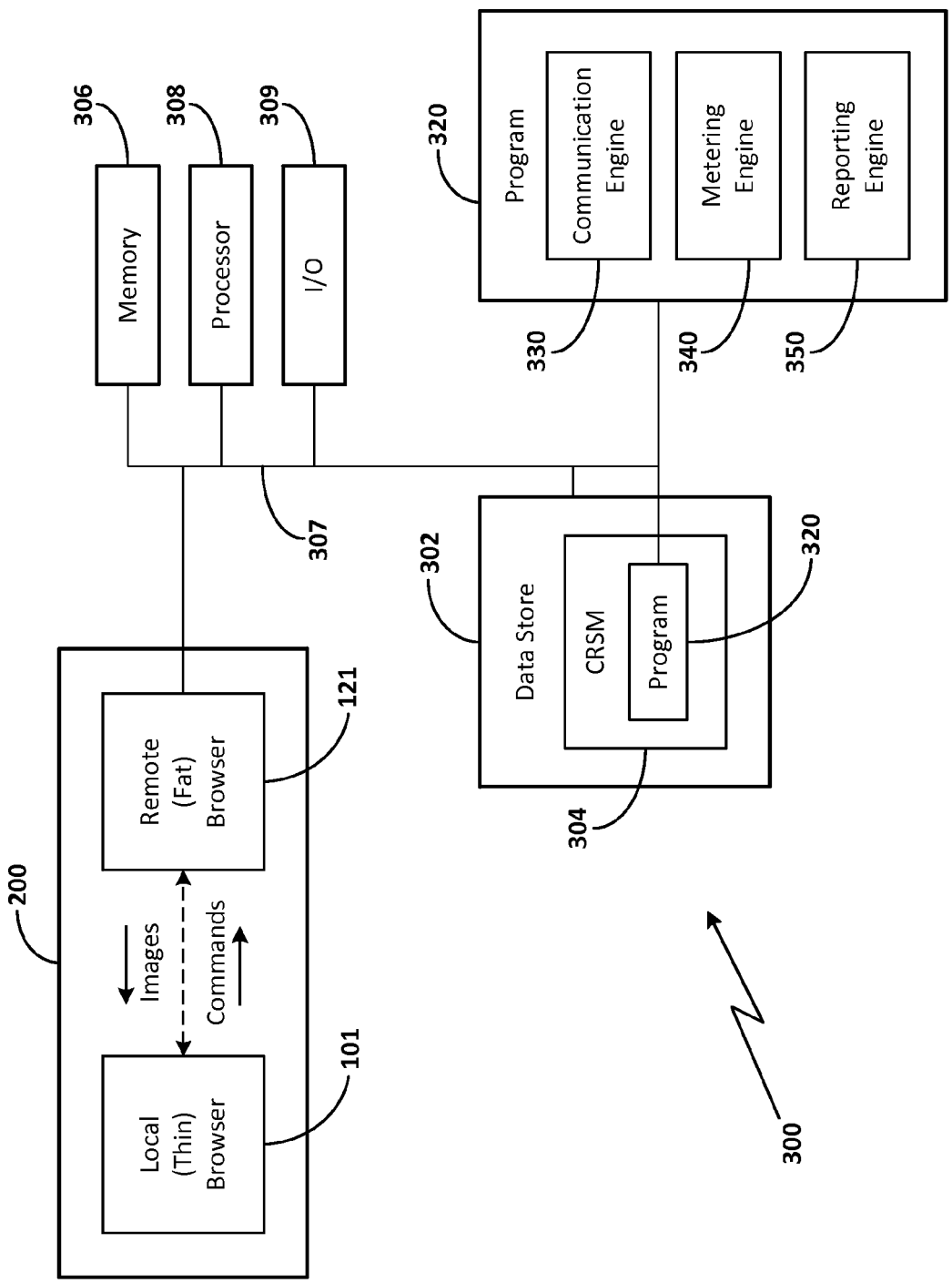
FIG. 3 illustrates an example system for remote metering for panelist Web usage.

FIG. 3 illustrates an example system for remote metering for panelist Web usage. In FIG. 3, remote metering system 300 includes the previously mentioned local browsers 101 implemented on media devices 62 and 63 and browser 121 implemented remote from the local browser 101 on analytics server 42.

In operation of the system 300, a panelist 66 may request a Web page 30 using the local browser 101, The local browser 101 sends a Web page request to the remote browser 121. That is, when a panelist 66 touches a screen or clicks on a link associated with Web page 30, the local browser 101 sends a signal to the remote browser 121. The remote browser 121 accesses Web site 22 to request the Web page 30. In response, the video program provider 20 loads the Web page 30 on the remote browser 121. The remote browser 121 renders the Web page 30 and provides a representation of the Web page 30 to the local browser 101. However, the remote browser 121 records Web site usage of the panelist 66 based on Web pages 30 rendered on the remote browser 121. The remote browser 121 may render encrypted and unencrypted Web pages. That is, the remote browser 121 may incorporate decryption mechanisms that allow rendering of encrypted Web pages. The thus-decrypted Web pages may be provided to the local browser 101.

To enable the above-disclosed operations, the system 300, in addition to the local browsers 101 and the remote browser 121 includes data store 302. Data store 302 includes a non-transitory computer-readable storage medium 304 on which resides remote metering program 320. The system 300 further includes memory 306, processor 308, input/output (I/O) 309, and communications and signaling bus 307.

The processor 308 loads the program 320 into memory 306 and then executes the instructions of remote metering program 320. The I/O 309 allows human and machine interaction with the system 300.

In an embodiment, some components of program 320 may be stored in a non-transitory computer readable storage medium of the media devices 62 and 63, and may be executed by processors contained thereon.

The program 320 includes communications engine 330, metering engine 340, and reporting engine 350. The communications engine 330 provides communications between the browsers 101 and 121, including commands from the browser 101 to the browser 121, and presentation of the Web pages 30 at the local browser 101.

The metering engine 340 records data associated with Web site usage by the panelist 66. For example, the metering engine 340 may record iris of Web sites visited, length of time viewing, time of day, and other data. The metering engine 340 may store the data in data store 302 for subsequent use by other components of the analytics service 40.

The reporting engine 350 may report stored Web usage data for the panelist 66 to other components and entities shown in FIG. 2.

Figure 4:
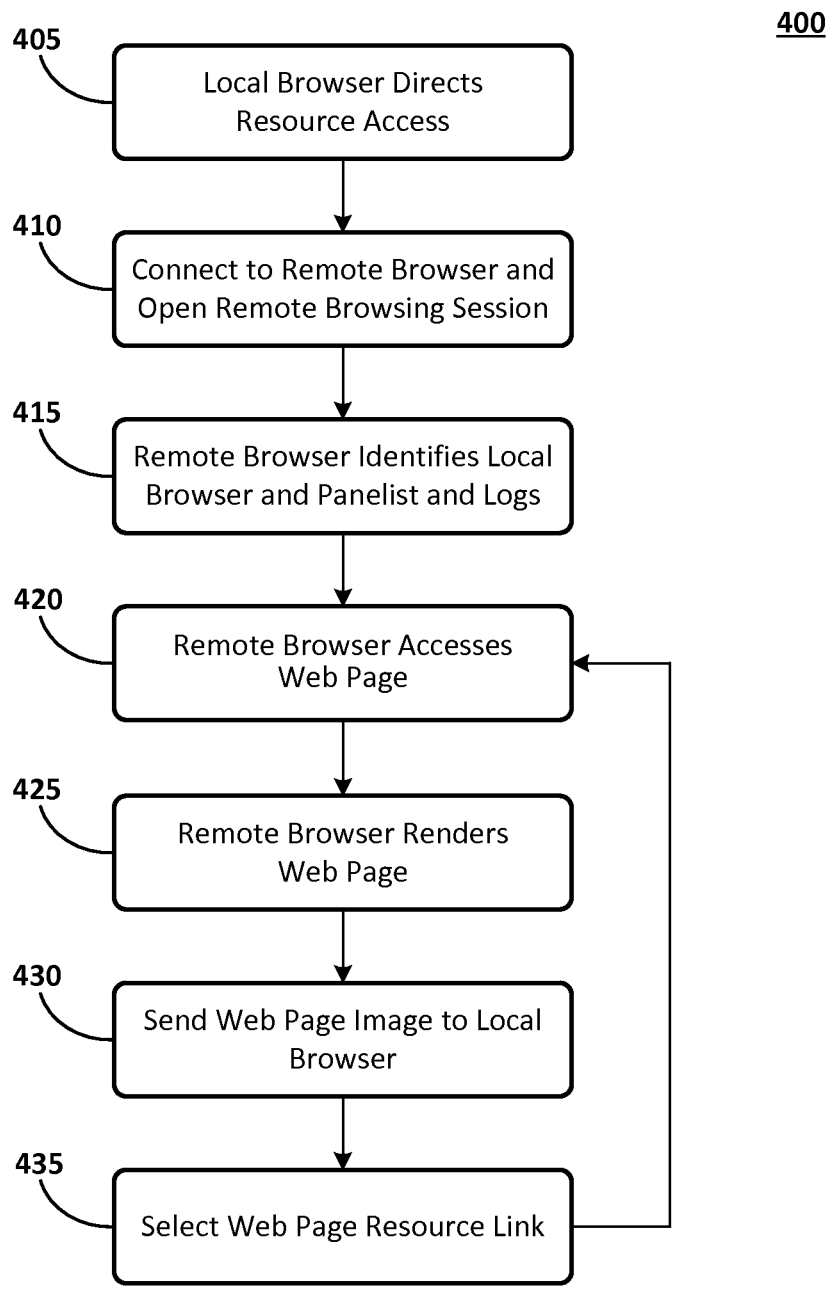
FIG. 4 illustrates a method for remote metering of panelist Web usage.

FIG. 4 illustrates a method for remote metering of panelist Web usage. In method 400, the panelist 66 has initiated operation of media device 63 and has launched local browser 101 to access Internet Web sites. in FIG. 4, method 400 begins in block 405 when panelist 66 directs local browser 101 to access an online resource such as by clicking on a link to Web page 30. In block 410, the local browser 101 establishes a connection with remote browser 121 and sends a command to browser 121 to access and render the Web page 30. In block 415, the browser 121 logs and confirms an identity of the panelist 66 and the panelist's media device. In block 420, the remote browser 121 accesses the Web page 30 and in block 425, renders the Web page 30. In block 430, the remote browser 121 sends the local browser 101 an image of the Web site 30. The image may show all the control features, links, and content of the Web page 30. In block 435, the panelist 66 operates the media device to select a resource link displayed on the image presented by the local browser 101. The method 400 then returns to block 420, and remote rendering and local image display operations are repeated. The method 400 may end when the panelist operates local browser 101 to close the remote browser 121.

Certain of the devices shown in FIGS. 1-3 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flowchart and accompanying description to illustrate the embodiments represented in FIG. 4. The disclosed devices, components, and systems contemplate using or implementing any suitable technique for performing the steps illustrated. Thus, FIG. 4 is for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

I claim:

1. A method of metering Web usage by a panelist, comprising:
    transmitting, from a local browser installed on a media device over a computer network to an analytics server, a first command comprising a request to access a first Web page, the analytics server accessing the first Web page;
    sending, by the media device to the analytics server, a device identifier of the media device and a user identifier of a user of the media device, the analytics server confirming that the media device and a user of the media device belong to a panel;
    establishing, by the media device, a remote display session between the media device and the analytics server;
    receiving, by the media device from the analytics server via the established remote display session, a first image of the first Web page as rendered by a remote browser installed on the analytics server, the analytics server recording Web usage metrics associated with the rendering of the first image at the remote browser;
    displaying, by the local browser, the first image.

2. The method of claim 1, wherein the local browser comprises a thin browser and the remote browser comprises a fat browser.

3. The method of claim 2, further comprising:
    transmitting, by the media device to the analytics server, a second command responsive to a click of a link in the first image, receipt of the second command triggering the fat browser to access and render the second Web page, and
    receiving, by the media device from the analytics server, a second image as rendered by the remote browser, the analytics server recording second Web usage metrics associated with display of the second image, and
    displaying, by the local browser, the second image.

4. The method of claim 1, wherein the Web usage metrics include the device identifier and the user identifier.

5. A system for metering Web usage by a panelist, the system comprising an analytics server comprising a memory and one or more processors configured to execute a remote browser;
    wherein the analytics server is configured to:
        receive, over a computer network, a command from a local browser installed on a media device, the command comprising a request to access a Web page, and
        confirm that the media device and a user of the media device belong to a panel;
    and wherein the remote browser is configured to:
        access the Web page, and render the Web page;
    and wherein the analytics server is further configured to:
        send an image of the Web page to the media device, the local browser displaying the image; and
        record, to the memory, Web usage metrics associated with the display of the image by the user of the media device belonging to the panel.

6. The system of claim 5, wherein the Web page includes encrypted resources, and wherein the remote browser is further configured to decrypt the encrypted resources.

7. The system of claim 5, wherein the analytics server is further configured to record, to the memory, the website uniform resource locator, a length of visit, a day and time of visit, and actions performed in the local browser during display of the image.

8. The system of claim 7, wherein the image includes videos, wherein the videos include video advertisements, and wherein the actions include skipping one or more video advertisements.

9. The system of claim 8, wherein the analytics server is further configured to record, to the memory, an impression of an advertisement contained in the image.

10. A method of metering Web usage by a panelist, comprising:
    receiving, by an analytics server via a computer network, a command from a local browser installed on a media device, the command comprising a request to access a Web page;
    confirming, by one or more processors of the analytics server, that the media device and a user of the media device belong to a panel;
    accessing, by the analytics server from a web server, the Web page;
    rendering, by a remote browser executed by the one or more processors, the Web page;

sending, by the analytics server, an image of the Web page to the media device, the local browser displaying the image; and recording, to a memory of the analytics server, Web usage metrics associated with the rendering of the image by the remote browser.

11. The method of claim 10, wherein the media device is a mobile device and further comprising reducing, by the remote browser, the image size from the rendered Web page.

12. The method of claim 10, wherein the media device is a mobile device, and further comprising rendering, by the remote browser, the resource with a size matching a display of the mobile device.

13. The method of claim 10, wherein the image is an image of a streaming video.

14. The method of claim 10, wherein the remote processor further operates to record the website uniform resource locator, a length of visit, a day and time of visit, and actions performed in the local browser during display of the image.

15. The method of claim 14, wherein the image comprises an image from a video comprising one or more video advertisements, and wherein the actions include skipping one or more video advertisements.

16. The method of claim 15, wherein the analytics server records an impression of an advertisement contained in the image.

17. A computer readable storage medium comprising instructions for metering Web usage by a panelist that when executed by a processor of a media device, cause the processor to:

transmit, from a local browser installed on the media device via a computer network to an analytics server, a first command comprising a request to access a first Web page, receipt of the first command triggering the analytics server to access the first Web page;

send, to the analytics server, a device identifier of the media device and a user identifier of a user of the media device, receipt of the device identifier triggering the analytics server to confirm that the media device and a user of the media device belong to a panel;

receive, from the analytics server, a first image of the first Web page rendered by a remote browser executed by the analytics server, the analytics server recording Web usage metrics associated with the rendering of the first image by the remote browser;

display, by the local browser, the first image.

18. The computer readable medium of claim 17, wherein the local browser comprises a thin browser and the remote browser comprises a fat browser.

19. The computer readable medium of claim 18, wherein execution of the instructions further causes the processor to:

transmit, to the analytics server, a second command identifying a click of a link in the first image, receipt of the second command triggering the remote browser to access and render a second Web page, receive, from the analytics server, a second image as rendered by the remote browser, the analytics server recording second Web usage metrics associated with rendering of the second image by the remote browser, and display, by the local browser, the second image.

20. The computer readable storage medium of claim 17, wherein the Web usage metrics include the device identifier and the user identifier.

* * * * *